US012745329B2

(12) United States Patent
Archer et al.

(10) Patent No.: US 12,745,329 B2
(45) **Date of Patent: *Sep. 22, 2026**

(54) MULTI-CHANNEL LED DRIVER WITH INTEGRATED LEDS HAVING A MULTILAYER STRUCTURE

(71) Applicant: ERP POWER, LLC, Westlake Village, CA (US)

(72) Inventors: Michael Archer, Moorpark, CA (US); Louis Chen, Simi Valley, CA (US); James H. Mohan, Valencia, CA (US)

(73) Assignee: ERP POWER, LLC, Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/830,400

(22) Filed: Sep. 10, 2024

(65) Prior Publication Data

US 2025/0008621 A1 Jan. 2, 2025

Related U.S. Application Data

(63) Continuation of application No. 18/510,457, filed on Nov. 15, 2023, now Pat. No. 12,127,312, which is a (Continued)

(51) Int. Cl.
*H05B 45/14* (2020.01)
*F21K 9/238* (2016.01)

(Continued)

(52) U.S. Cl.
CPC ............. *H05B 45/14* (2020.01); *F21K 9/238* (2016.08); *F21V 19/003* (2013.01); *H05B 45/355* (2020.01)

(58) Field of Classification Search
CPC ...... H05B 45/14; H05B 45/355; H05B 45/20; H05B 45/382; F21K 9/238; F21V 19/003
See application file for complete search history.

(56) References Cited

U.S. PATENT DOCUMENTS 413,513 A * 10/1889 Inch .......................... C23C 8/22 148/235
6,657,381 B1 12/2003 Arutaki
(Continued)

FOREIGN PATENT DOCUMENTS

CN 207852672 U 9/2018
EP 2 557 905 A1 2/2013
(Continued)

OTHER PUBLICATIONS

International Search Report and Written Opinion issued in corresponding International Application No. PCT/US24/18956, issued Jul. 30, 2024, 17 pages.

(Continued)

*Primary Examiner* — Abdullah A Riyami
*Assistant Examiner* — Syed M Kaiser
(74) *Attorney, Agent, or Firm* — Womble Bond Dickinson (US) LLP

(57) ABSTRACT

An integrated multi-layered lighting system includes a first board having a first component area and a first light area, a second board coupled to and offset from the first board, the second board having a first opening overlapping the first light area of the first board in a plan view, and a second component area overlapping the first component area of the first board in a plan view, a plurality of light emitting diodes (LEDs) coupled to the first board and positioned in the first light area corresponding to the first opening of the second board, and a light driver configured to drive the plurality of LEDs and including a plurality of first components coupled to the first board and positioned in the first component area and a plurality of second components coupled to the second board and positioned in the second component area.

19 Claims, 6 Drawing Sheets

Related U.S. Application Data continuation of application No. 17/849,492, filed on Jun. 24, 2022, now Pat. No. 11,864,281.

(60) Provisional application No. 63/219,747, filed on Jul. 8, 2021.

(51) Int. Cl.

*F21V 19/00* (2006.01)
*H05B 45/355* (2020.01)

(56) References Cited

U.S. PATENT DOCUMENTS 6,819,506 B1 11/2004 Taylor
8,123,381 B1 * 2/2012 Wray ........ F21K 9/23 362/373
8,894,254 B2 11/2014 Matsuda et al.
9,237,621 B1 * 1/2016 Xiong ........ H05B 45/10
9,258,895 B1 2/2016 Tate
9,429,306 B2 8/2016 Liu
10,426,003 B2 * 9/2019 Jiang ........ F21K 9/27
10,584,862 B2 3/2020 Kim et al.
10,652,962 B1 5/2020 Qiu
10,982,829 B2 4/2021 Danesh
11,435,064 B1 9/2022 Danesh
11,864,281 B2 * 1/2024 Archer ........ H05B 45/20
12,127,312 B2 * 10/2024 Archer ........ F21K 9/238
2003/0117087 A1 * 6/2003 Barth ........ H05B 45/12 315/307
2006/0022214 A1 * 2/2006 Morgan ........ F21K 9/00 257/E25.032
2008/0291360 A1 * 11/2008 Pei ........ H05K 3/0061 349/62
2009/0080189 A1 * 3/2009 Wegner ........ H05B 45/382 362/249.02
2010/0026208 A1 * 2/2010 Shteynberg ........ H05B 45/3725 315/297
2010/0046224 A1 * 2/2010 Lin ........ F21V 19/003 362/249.02
2010/0053950 A1 3/2010 Higuchi et al.
2010/0097811 A1 * 4/2010 Betsuda ........ F21V 23/002 362/382
2011/0110095 A1 5/2011 Li et al.
2011/0285292 A1 11/2011 Mollnow et al.
2011/0309760 A1 * 12/2011 Beland ........ H05B 45/38 315/254
2012/0043560 A1 * 2/2012 Wu ........ F21K 9/00 257/E33.066
2012/0140442 A1 6/2012 Woo et al.
2013/0128578 A1 5/2013 Yu et al.
2013/0271997 A1 10/2013 Kim et al.
2014/0085829 A1 * 3/2014 Yamashita ........ H05K 1/0204 361/717
2014/0097761 A1 * 4/2014 Chen ........ H05B 45/58 315/192
2014/0103794 A1 * 4/2014 Ueda ........ F21K 9/23 313/318.01
2014/0247598 A1 9/2014 Song et al.
2014/0300274 A1 * 10/2014 Acatrinei ........ H05B 45/3578 315/122
2014/0362568 A1 * 12/2014 Su ........ F21V 23/006 362/235
2015/0252972 A1 * 9/2015 Jiang ........ F21S 8/085 362/237
2015/0282260 A1 10/2015 Hussell et al.
2015/0351174 A1 * 12/2015 Chen ........ H05B 45/10 315/127
2015/0382417 A1 12/2015 Chou et al.
2016/0018078 A1 * 1/2016 Katoh ........ H10H 20/856 362/296.04
2017/0159891 A1 * 6/2017 Yanwei ........ H05K 1/00
2017/0196060 A1 * 7/2017 Watanabe ........ H05B 45/30
2018/0356717 A1 12/2018 Cho
2019/0032859 A1 1/2019 Novak
2019/0041046 A1 2/2019 Sun et al.
2019/0049080 A1 2/2019 Danesh
2019/0101277 A1 4/2019 Kim
2019/0195479 A1 6/2019 Bonne
2019/0230756 A1 * 7/2019 Jiang ........ H05B 45/3578
2020/0214097 A1 7/2020 Qiu et al.
2020/0363042 A1 11/2020 Jeswani
2020/0393112 A1 12/2020 Portinga et al.
2020/0413513 A1 * 12/2020 Mohan ........ H02M 7/06
2020/0413514 A1 * 12/2020 Qiu ........ H05B 45/10
2021/0018148 A1 1/2021 Yanwei
2022/0086984 A1 3/2022 Archer et al.
2022/0095430 A1 3/2022 Archer et al.
2022/0252244 A1 8/2022 Erdener et al.
2022/0364716 A1 11/2022 Hawkins
2023/0012403 A1 1/2023 Archer et al.
2023/0083227 A1 3/2023 Archer et al.
2024/0302031 A1 9/2024 Archer et al.
2024/0314903 A1 9/2024 Archer et al.

FOREIGN PATENT DOCUMENTS

EP 2650609 A1 10/2013
EP 2 624 663 B1 5/2015
KR 10-1911762 B1 10/2018
KR 10-2471945 B1 12/2022
WO WO 2013/022283 A2 2/2013
WO WO 2024/187043 A1 9/2024
WO WO 2025/096864 A1 5/2025
WO WO 2025/096865 A1 5/2025
WO WO 2025/096866 A1 5/2025

OTHER PUBLICATIONS

International Search Report issued in corresponding application No. PCT/US2024/054014, dated Feb. 24, 2025, 3 pages.
Written Opinion issued in corresponding application No. PCT/US2024/054014, dated Feb. 24, 2025, 5 pages.
International Search Report issued in corresponding application No. PCT/US2024/054015, dated Feb. 18, 2025, 3 pages.
International Written Opinion issued in corresponding application No. PCT/US2024/054015, dated Feb. 18, 2025, 5 pages.
International Search Report issued in corresponding application No. PCT/US2024/054016, Feb. 14, 2025, 3 pages.
International Written Opinion issued in corresponding application No. PCT/US2024/054016, Feb. 14, 2025, 4 pages.

* cited by examiner

MULTI-CHANNEL LED DRIVER WITH INTEGRATED LEDS HAVING A MULTILAYER STRUCTURE

CROSS-REFERENCE TO RELATED APPLICATION(S)

This application is a continuation of U.S. patent application Ser. No. 18/510,457, filed Nov. 15, 2023, which is a continuation of U.S. patent application Ser. No. 17/849,492, filed on Jun. 24, 2022, which claims priority to, and the benefit of, U.S. Provisional Application No. 63/219,747 ("LED DRIVER WITH INTEGRATED DESATURATED LEDS IN MULTILAYER HOUSING FOR HUMAN CENTRIC BLACK BODY DIMMING"), filed on Jul. 8, 2021, the entire contents of which are incorporated herein by reference.

The present application is also related to U.S. patent application Ser. No. 17/473,914 ("LED DRIVER WITH INTEGRATED LED LIGHTING FOR HUMAN CENTRIC BLACK BODY DIMMING"), filed on Sep. 13, 2021, which claims priority to and the benefit of U.S. Provisional Application No. 63/079,981 ("LED DRIVER WITH INTEGRATED LED LIGHTING FOR HUMAN CENTRIC BLACK BODY DIMMING"), filed on Sep. 17, 2020, the entire contents of which are incorporated herein by reference.

FIELD

Aspects of the present invention are related to light emitting diode (LED) drivers.

BACKGROUND

A light emitting diode (LED) is an electronic device that converts electrical energy (commonly in the form of electrical current) into light. The light intensity of an LED is primarily based on the magnitude of the driving current. An LED light source may simulate warm colors by optically mixing light from white LEDs with other color LEDs, such as amber LEDs, and controlling their drive currents to in a manner such that the light combination changes from a white color light to a more yellowish/orangish white light. In the related art, such LED light sources, which mix light from colored LEDs use separate drivers for controlling the different LEDs individually. However, such solutions present additional costs and involve complex control schemes. Further, in the related art, the driver(s), the power supply circuits, and the LED light sources are in separate device housings and are electrically connected to one another through electrical cables. This may make such lighting systems unsuitable for applications having tight spatial constraints.

The above information disclosed in this Background section is only for enhancement of understanding of the invention, and therefore it may contain information that does not form the prior art that is already known to a person of ordinary skill in the art.

SUMMARY

Aspects of embodiments of the present invention are directed to a dimmable LED driver with integrated LEDs in a single, compact, multilayer housing. The LED driver is in the form of a single fixture and includes features, such as wireless capabilities, color temperature mixing, and an integrated LED array. In some embodiments, this LED driver has a multilayered structure with multiple PCB layers that provide additional surface area for mounted components. This structure allows the LED driver to fit LED channels, a microprocessor, power electronic circuitry, and control circuitry onto a multilayered PCB design that remains compact and is able to fit into existing fixtures. In some embodiments, the use of one or more ring PCB daughter boards allows for the LED channels to be mounted to the main PCB layer without obstructions from the second or higher layers. In some embodiments, the multi-layer LED driver is configured to change the intensity of the light emitted and to adjust the color mixing of the LED channels to replicate light temperatures, which follow the black body curve.

According to some embodiments, there is provided an integrated multi-layered lighting system including: a first board having a first component area and a first light area; a second board coupled to and offset from the first board, the second board having a first opening overlapping the first light area of the first board in a plan view, and a second component area overlapping the first component area of the first board in a plan view; a plurality of light emitting diodes (LEDs) coupled to the first board and positioned in the first light area corresponding to the first opening of the second board; and a light driver configured to drive the plurality of LEDs and including a plurality of first components coupled to the first board and positioned in the first component area and a plurality of second components coupled to the second board and positioned in the second component area.

In some embodiments, the first board includes a metal core layer configured to be mounted to a fixture, the metal core layer being opposite from the plurality of LEDs.

In some embodiments, the metal core layer includes at least one of aluminum and copper.

In some embodiments, a ground reference of the second board is electrically isolated from the metal core layer of the first board.

In some embodiments, the metal core layer of the first board is configured to dissipate heat generated by the LEDs to the fixture and to provide electrical ground to the LEDs.

In some embodiments, the plurality of first components include surface-mount electrical components, and the plurality of second components include through-hole-mounted electrical components.

In some embodiments, the light driver has a primary side and a secondary side electrically isolated from, and inductively coupled to, the primary side, the plurality of first components includes components electrically coupled at the secondary side, and wherein the plurality of second components includes components electrically coupled at the primary side.

In some embodiments, the plurality of first components includes: a current sensor configured to sense a first channel current of the plurality of LEDs and to generate a first sense signal; an error amplifier configured to receive the first sense signal and a first reference signal, and to generate a gate control signal based on a difference between the first reference signal and the first sense signal; a voltage-controlled resistor (VCR) configured to adjust the first channel current by dynamically adjusting a resistance of the VCR based on the gate control signal; and a channel controller configured generate the first reference signal based on a color temperature according to a black body curve.

In some embodiments, the VCR includes: a field effect transistor (FET) having a gate electrically coupled to an output of the error amplifier.

In some embodiments, the plurality of first components further includes: a first rectifier coupled to a secondary winding of a transformer of the light driver and configured to prevent a reverse current at a first color channel of the plurality of LEDs; and a first low pass filter coupled between the first rectifier and the first color channel and configured to produce a first channel current as a first DC current.

In some embodiments, the plurality of second components includes: a rectifier configured to rectify an input AC signal and to generate a rectified input signal; a regulator configured to generate an output signal based on the rectified input signal for driving the LEDs; a power factor correction (PFC) circuit configured to regulate a DC-level of the output signal based on a correction signal; a transformer having the primary side and the secondary side; and an optocoupler configured to communicate the correction signal to the PFC circuit from the secondary side of the light driver.

In some embodiments, the integrated multi-layered lighting system further includes: a third board coupled to and offset from the second board, the third board having a second opening overlapping the first light area of the first board in a plan view, and a third component area overlapping the second component area of the second board in a plan view, wherein the light driver further includes a plurality of third components coupled to the third board and positioned in the third component area.

In some embodiments, the plurality of third components include at least one of a surface-mount component and a through-hole-mounted component.

In some embodiments, the plurality of LEDs include one or more green LEDs, one or more blue LEDs, and one or more red LEDs.

In some embodiments, the second board is physically offset from the first board via one or more spacers.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

The detailed description set forth below is intended as a description of example embodiments of a compact, integrated multi-layered lighting system, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Aspects of some embodiments of the present disclosure are directed to an integrated multi-layered lighting system in a single fixture with wireless capabilities, color temperature mixing, and an integrated LED array, which does not sacrifice functionality in favor of space. In some embodiments, this integrated lighting system is multilayered with multiple printed circuit board (PCB) layers that provide additional surface area for mounted components. The resulting lighting system may mimic the color temperature of an ideal black body radiator while being able to fit LED channels, a microprocessor, power electronic circuitry, and control circuitry onto a multilayered PCB design that remains compact and is able to fit into existing fixtures.

According to some embodiments, the compact, multilayer design of the lighting system maximizes the amount of space for installing through-hole components. In some examples, the use of one or more ring PCB boards allows for the LED channels to be mounted to the first PCB layer without obstructions from the second or higher layers.

Figure 1:
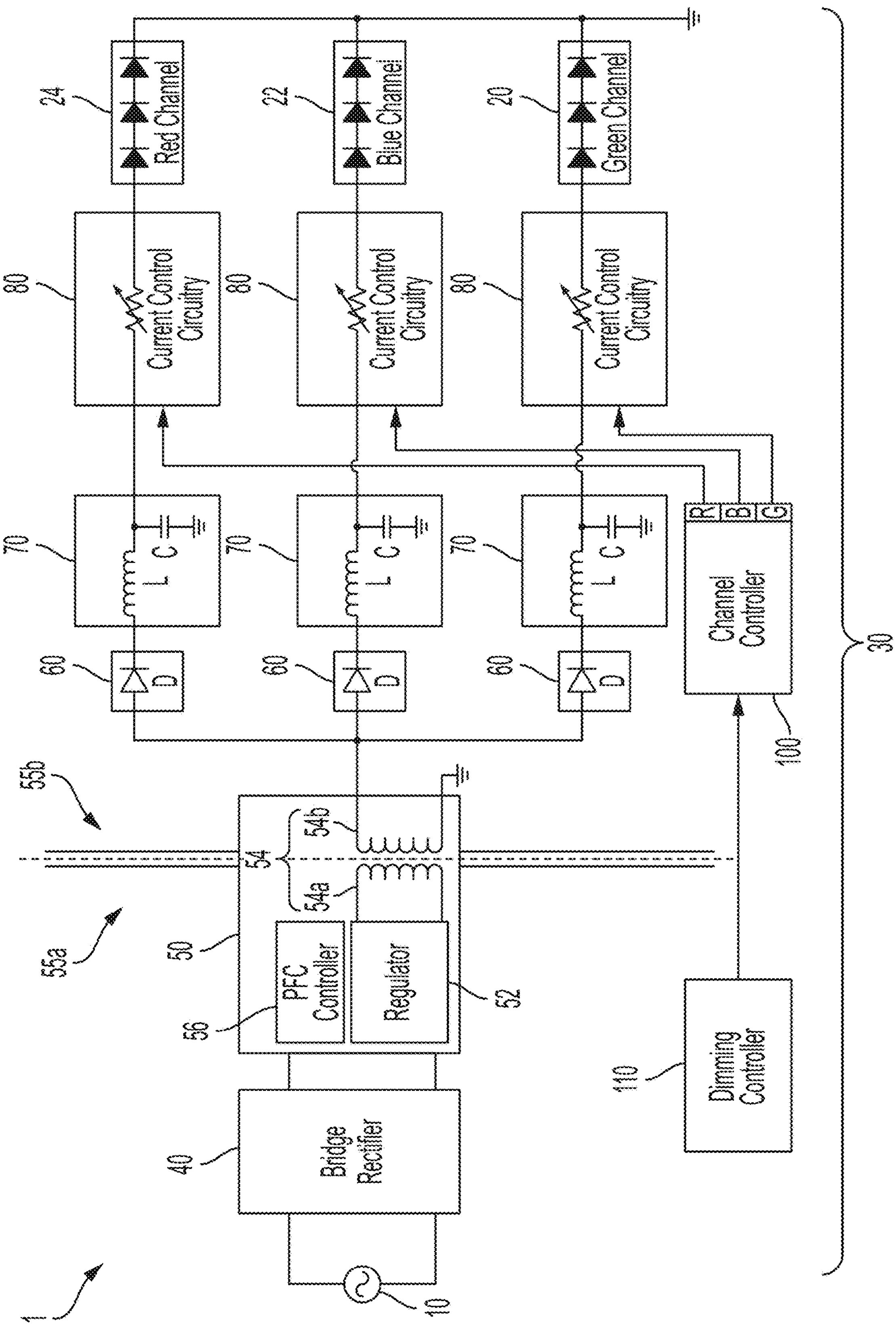
FIG. 1 illustrates a lighting system including a multi-channel light driver, according to some example embodiments of the present disclosure.

FIG. 1 illustrates a lighting system including a multi-channel light driver, according to some example embodiments of the present disclosure.

According to some embodiments, the lighting system 1 includes an input source 10, a plurality of color channels (e.g., a plurality of LED channels) 20, 22, and 24, and a multi-channel light driver 30 for powering and controlling the brightness/intensity of the color channels 20, 22, and 24.

The input source 10 may include an alternating current (AC) power source that may operate at a voltage of 100 Vac, a 120 Vac, a 240 Vac, or 277 Vac, for example. The input source 10 may also include a dimmer electrically powered by said AC power sources. The dimmer may modify (e.g., cut/chop a portion of) the input AC signal according to a dimmer level before sending it to the light driver 30, and thus variably reduces the electrical power delivered to the light driver 30 and the color channels 20, 22, and 24. In some examples, the dimmer may be a TRIAC or ELV dimmer, and may chop the front end or leading edge of the AC input signal. According to some examples, the dimmer interface may be a rocker interface, a tap interface, a slide interface, a rotary interface, or the like.

In some embodiments, the plurality of color channels includes a first channel (e.g., a green channel) 20, a second channel (e.g., a blue channel) 22, and a third channel (e.g., a red channel) 24. Each channel may include one or more light-emitting-diodes (LEDs) of the corresponding colors (e.g., red, green, or blue LEDs). While in some embodiments, the first through third color channels 22-24 represent RGB colors, embodiments of the present disclosure are not limited thereto, and the plurality of channels may include any suitable number of color channels. Further, embodiments, of the present disclosure are not limited to LEDs, and in some examples, other solid-state lighting devices may be employed.

In some embodiments, the multi-channel light driver 30 includes a rectifier 40, a power supply circuit 50, a plurality of rectifiers 60, a plurality of filters 70, a plurality of current control circuits 80, and a channel controller 100.

The rectifier 40 may provide a same polarity of output for either polarity of the AC signal from the input source 10. In some examples, the rectifier 40 may be a full-wave circuit using a center-tapped transformer, a full-wave bridge circuit with four diodes, a half-wave bridge circuit, or a multi-phase rectifier.

The power supply circuit 50 converts the rectified AC signal generated by the rectifier 40 into a drive signal for powering the plurality of color channels 20, 22, and 24. In some embodiments, the power supply circuit 50 includes a voltage regulator 52 for maintaining (or attempting to maintain) a constant DC bus voltage on its output while drawing a current that is in phase with and at the same frequency as the line voltage (by virtue of the PFC circuit). A transformer 54 inside the power supply circuit 50 produces the desired output voltage from the DC bus. In some examples, the power supply circuit 50 may include a PFC circuit (or PFC controller) 56 for improving (e.g., increasing) the power factor of the load on the input source 10 and reducing the total harmonic distortions (THD) of the light driver 30. The power supply circuit 50 has a primary side 55*a* and a secondary side 55*b* that is electrically isolated from, and inductively coupled to, the primary side 55*a*. The primary and secondary sides 55*a* and 55*b* may correspond to the primary and secondary windings 54*a* and 54*b* of the transformer 54.

According to some embodiments, the multi-channel light driver 30 drives the plurality of color channels 20, 22, and 24 to produces light temperatures that follow the blackbody curve. In so doing, the multi-channel light driver 30 may perform color mixing of, for example, red, blue, and green light to achieve the desired light temperature. In some embodiments, the multi-channel light driver 30 determines the color temperature based on a dimmer setting, a time of day, or a combination thereof.

In some embodiments, the driving current of each of the plurality of color channels 20, 22, and 24 may be derived from the same secondary winding 54*b* of the transformer 54. While the plurality of color channels 20, 22, and 24 are driven by the same winding, the channel current of each color channel is independent of the other color channels. This independent control of the channel currents is enabled by utilizing a separate/different current control circuit 80 for each color channel 20/22/24.

According to some embodiments, each color channel 20/22/24 has a dedicated rectifier (e.g., diode) 60 and filter 70, which convert the AC driving signal output by the secondary winding 54*a* of the transformer 54 into a DC channel current for driving the corresponding color channel 20/22/24. The anodes of the rectifiers 60 may all be connected (e.g., directly connected) to the same output terminal of the power supply circuit 50. Having separate rectifiers 60 for each color channel allows for each channel to be driven by a different voltage. The rectifiers 60 also prevent back-flow of current from one color channel 20/22/24 to another, which facilitates the accurate and individual control of channel current.

According to some embodiments, each of the plurality of current control circuits 80 is configured to adjust the channel current of the corresponding color channel 20/22/24 based on the drive signal from the power supply circuit 50 and a corresponding reference signal from the channel controller 100. The channel controller 100 is configured to generate the reference signals for the plurality of current control circuits 80 based on a desired color temperature.

Figure 2:
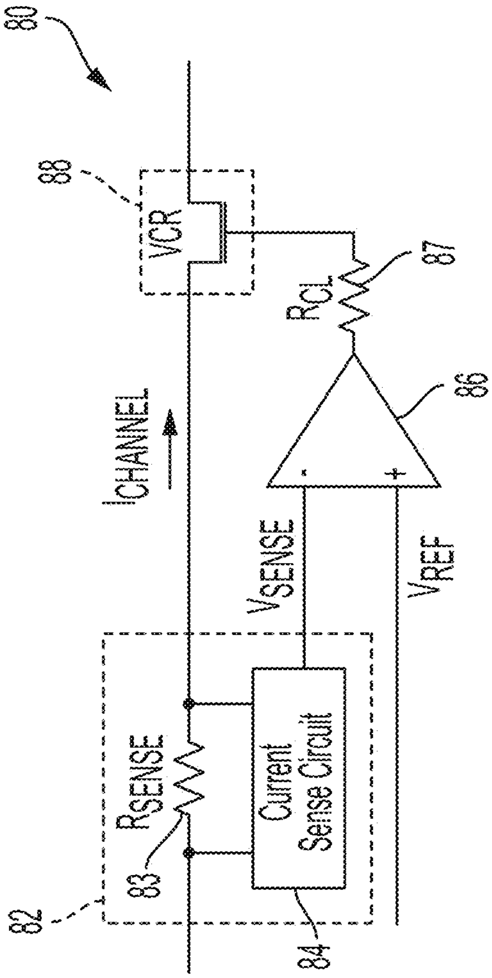
FIG. 2 illustrates a schematic diagram of a current control circuit, according to some embodiments of the present disclosure.

FIG. 2 illustrates a schematic diagram of a current control circuit 80, according to some embodiments of the present disclosure.

Referring to FIG. 2, in some embodiments, the current control circuit 80 is electrically coupled to the secondary side 55*b* of the power supply circuit 50 and is electrically isolated from the primary side 55*a*. The current control circuit 80 includes a current sensor 82 configured to sense a channel current ($I_{CHANNEL}$) of the corresponding color channel 20/22/24 and to generate a sense signal; an error amplifier (also referred to as a comparator) 86 configured to receive the sense signal from the current sensor 82 and the reference signal ($V_{REF}$) from the channel controller 100, and to generate the feedback signal (also referred to as an error signal/gate control signal) based on a difference between the reference signal and the sense signal; and a voltage-controlled resistor (VCR, e.g., a linear pass element) 88 that is configured to adjust the corresponding channel current by dynamically adjusting a resistance of the VCR 88 based on the feedback signal from the error amplifier 86.

In some embodiments, the current sensor 82 includes a sense resistor ($R_{SENSE}$) 83 that is coupled between the output of the power supply circuit 50 and the corresponding color channel 20/22/24 and is connected electrically in series with the corresponding color channel 20/22/24. The current sensor 82 also includes a current sense circuit 84 that is configured to sense a current of the color channel 20/22/24 by measuring the voltage drop across the sense resistor 83, and to generate the sense signal that is provided to the error amplifier 86 (e.g., to the negative input terminal of the error amplifier 86).

According to some embodiments, the VCR 88 is electrically connected in series with the sense resistor 83 and the color channel 20/22/24. In some embodiments, the VCR 88 is a field effect transistor (FET), such as a junction FET (JFET) or a metal-oxide-semiconductor FET (MOSFET) that operates in the quasi-saturation region (e.g., linear/ohmic region) and functions as a variable resistor, whose resistance is controlled by the gate voltage.

According to some embodiments, the feedback signal from the error amplifier 86 controls the resistance of the VCR 88 to regulate the channel current to a desired value, which corresponds to the reference signal. As the current control circuits 80 dynamically adjusts the resistance of the VCR 88 in response to the instantaneous changes in the channel current, the current control circuit 80 regulates the channel current to the desired level, as determined by the corresponding reference signal.

Referring again to FIG. 1, according to some embodiments, the channel controller 100 generates a reference signal for each of the plurality of color channels 20, 22, and 24 based on the desired color intensity of the channels. For example, when the color channels include a green color channel 20, a blue color channel 22, and a red color channel 24, the channel controller may generate a first reference signal corresponding to the desired green color intensity to send to the first current control circuit 80 associated with the green color channel 20; may generate a second reference signal corresponding to the desired blue color intensity to send to the second current control circuit 80 associated with the blue color channel 22; and may generate a third reference signal corresponding to the desired red color intensity to send to the third current control circuit 80 associated with the red color channel 24. By controlling the color intensity (as measured by lumens, Lm) of each of the red, blue, and green colors output by the color channels 20, 22, and 24, the channel controller 100 may not only enable light dimming, but also adjusts the color mixing of the channels 20, 22, and 24 to replicate light temperatures (temperature in kelvins, K), which follow the black body curve.

The channel controller 100 determines the color mix (e.g., the intensity of the red, blue, and green light colors) for each color temperature based on a lookup table that provides the light intensities of the different color channels. The tabulated color mix may accurately follow the black body curve.

Figure 3:
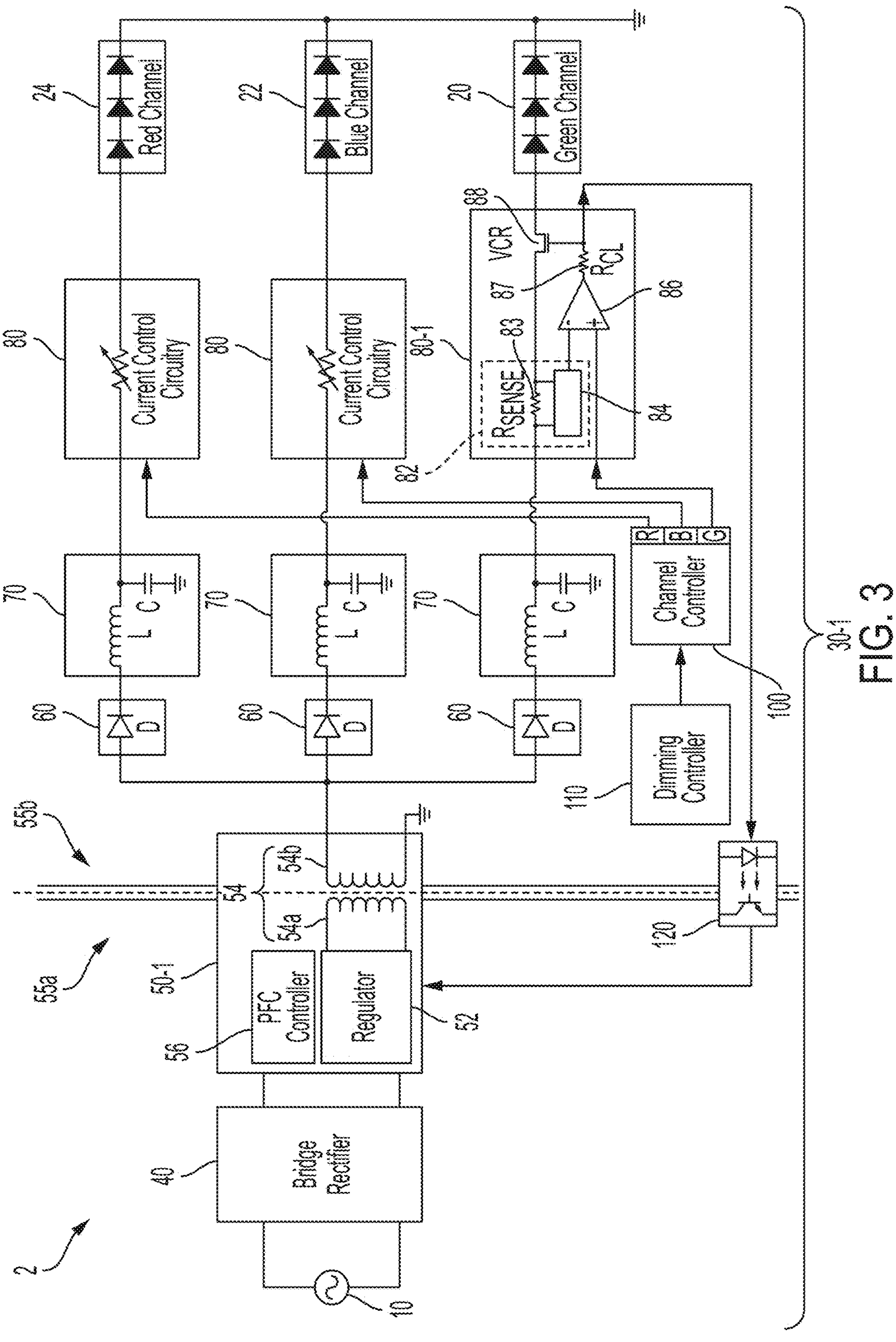
FIG. 3 illustrates a lighting system including a multi-channel light driver that provides overpower protection for a VCR, according to some example embodiments of the present disclosure.

FIG. 3 illustrates a lighting system 2 including a multi-channel light driver 30-1 that provides overpower protection for the VCR 88, according to some example embodiments of the present disclosure. As the lighting system 2 is substantially the same as the lighting system 1, with the exception of the feedback from the current control circuit 80-1, the output-control mechanism of the power supply circuit 50-1, and the optocoupler 120, the description of common elements between the two lighting systems 1 and 2 may not be repeated here. The following description will instead focus primarily on the differences between the two lighting systems.

Referring to FIG. 3, in some embodiments, the power supply circuit 50-1 monitors the state of the VCR 88 of the current control circuit 80-1 and adjusts its output voltage (i.e., the output voltage of the secondary winding 54*b*) to reduce or minimize the voltage drop across the VCRs 88. In some examples, current control circuit 80-1 corresponds to (e.g., is associated with) the green color channel 20.

In some examples, the feedback signal (also referred to as a correction signal) from the error amplifier 86 that controls the green color channel 20 is communicated through the primary-secondary barrier of the power supply circuit 50-1 via an optocoupler 120, which enables communication between the primary and secondary sides 55*a* and 55*b* while maintaining the electrical isolation between the two sides. In some embodiments, the feedback signal is provided to the PFC circuit 56, which may perform power factor correction for the power supply circuit 50-1.

In some embodiments, when the error amplifier 86 of the current control circuit 80-1 determines to increase the drive current of the green color channel 20 (e.g., when increasing the intensity of the green light), the corresponding feedback signal, which is transmitted to the primary side 55*a*, notifies the power supply circuit 50-1 to increase its output voltage to ensure sufficient drive voltage for the green color channel 20 (and hence the blue and red color channels 22 and 24). Conversely, when the error amplifier 86 of the current control circuit 80-1 determines to decrease the drive current of the green color channel 20 (e.g., when reducing the intensity of the green light), the corresponding feedback signal notifies the power supply circuit 50-1 to decrease its output voltage to prevent excessive power dissipation by the VCRs 88.

As such, by properly controlling the voltage headroom, the power supply circuit 50-1 may provide sufficient drive voltage and current to drive all of the independent color channels, while reducing or minimizing excess power dissipation by the VCRs. The multi-channel light driver 30-1 controls the headroom of all channels by using only a single feedback/control loop from one dominant color channel (e.g., the green color channel), rather than several different feedback loops. This reduces the number of optocouplers that are needed and greatly simplifies the control logic of the light driver 30-1, which translates to lower overall cost and size of the system.

According to some embodiments, the components of the light driver 1/2 are packaged within a multi-layered lighting system that has a multi-level printed circuit board (PCB) design that vertically stacks two or more PCB layers coupled by connectors/separators. The components of the lighting system 1/2 are mounted on the top side of the bottom PCB (e.g., main PCB) or on both the top and bottom sides of the remaining PCB board layers (e.g., daughter board layers). These layers may be added or removed in order to provide more space to mount all the components for the lighting system 1/2.

Figure 4:
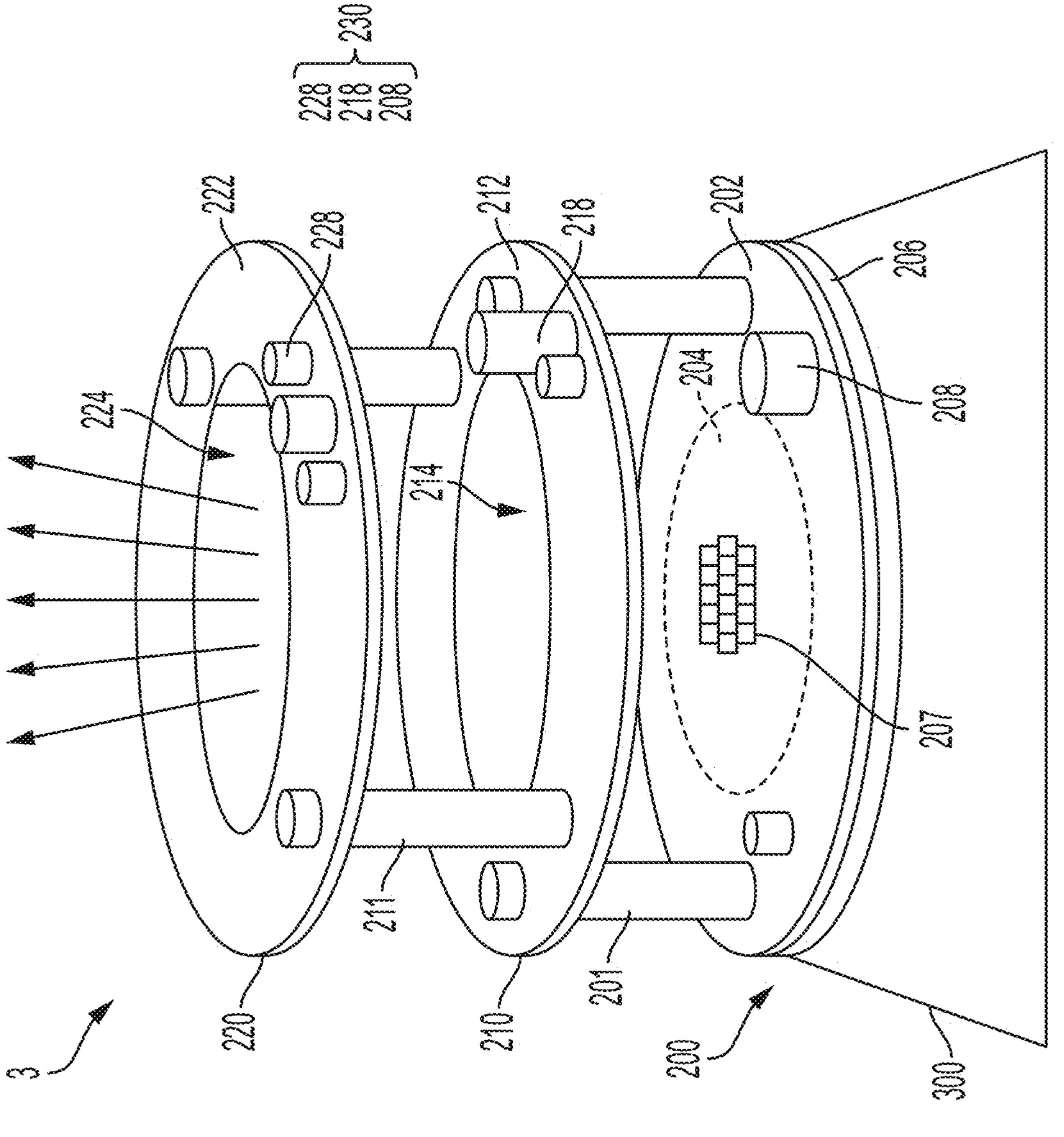
FIG. 4 is a schematic illustration of the integrated multi-layered lighting system, according to some embodiments of the present disclosure.
Figure 5A:
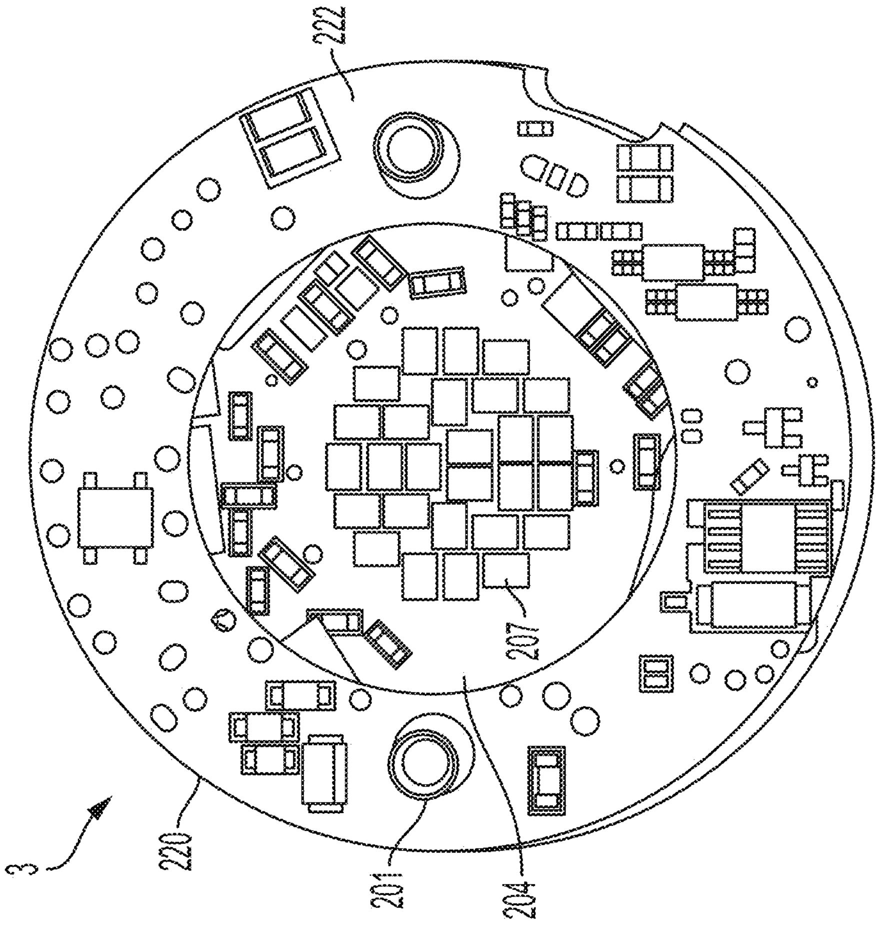
FIGS. 5A and 5B illustrate the top view and the perspective view, respectively, of the integrated multi-layered lighting system, according to some embodiments of the present disclosure.
Figure 5B:
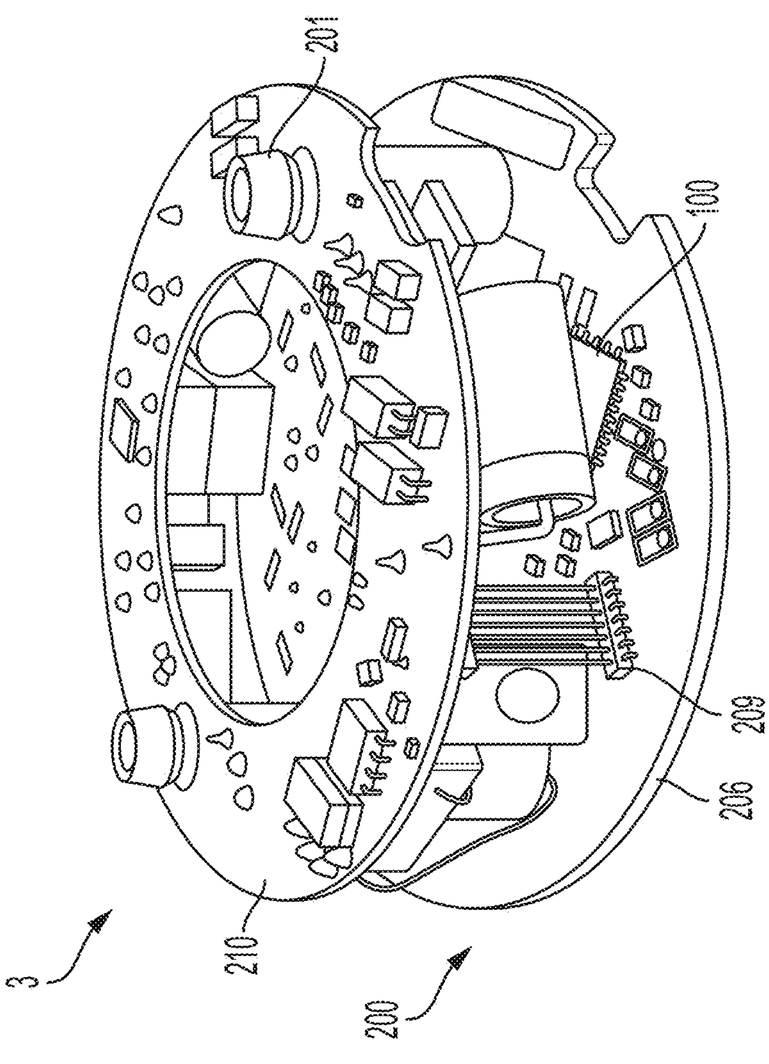

FIG. 4 is a schematic illustration of the integrated multi-layered lighting system 3, according to some embodiments of the present disclosure. FIGS. 5A and 5B illustrate the top view and the perspective view, respectively, of the integrated multi-layered lighting system 3, according to some embodiments of the present disclosure. The multi-layered lighting system 3 may be the same or substantially the same as the lighting system 1/2, except for the multi-tiered structure, which is described below. As such, for the sake of brevity, the description of the constituent components of the lighting system 3 may not be repeated here.

According to some embodiments, the integrated multi-layered lighting system 3 includes at least a first board 200 and a second board 210 coupled to and offset from the first board 200. The first board 200 may be a single-layer (e.g., a single-metal-layer) printed circuit board (PCB), and the second board 210 may be a PCB with one or more layers (e.g., metal layers). In some embodiments, the first board 200 has a first component area 202 and a first light area 204, and the second board 210 has a second component area 212 overlapping the first component area 202 of the first board 200 in a plan view and has a first opening 214 overlapping the first light area 204 of the first board 200 in a plan view. The first component area 202 may surround the first light area 204, and the second component area 212 may surround the first opening 214. The second board 210 may be physically offset from (e.g., vertically offset from) the first board 200 via first spacers (e.g., separators) 201.

In some embodiments, the integrated multi-layered lighting system 3 includes a plurality of light emitting diodes (LEDs) 207 coupled to the first board 200 and positioned in the first light area 204, which corresponds to the first opening 214 of the second board 210. The first opening 214 of the second board 210 allows for the light produced by the LEDs 207 to pass through the second board 210 without obstruction and to illuminate the target environment. The LEDs 207 may include one or more green LEDs of the green channel 20, one or more blue LEDs of the blue channel 22, and one or more red LEDs of the red channel 24. In some examples, The LEDs 207 are unsaturated LEDs, which serve to provide a more vibrant and consistent color to illuminated objects as compared to saturated LEDs. Unlike saturated LEDs, which may lack certain bands of light from the visible light spectrum, unsaturated LEDs produce light evenly among the spectrum and consistently fill in empty spaces on the light spectrum that otherwise may not be filled by saturated LEDs.

The first board 200 includes a metal core layer 206 that is configured to be mounted to a fixture 300. The metal core layer 206 is configured to provide electrical ground to the LEDs 207 and other electrical components on the first board 200, and to transfer (e.g., dissipate) the heat generated by the LEDs 207 during operation to the fixture 300. The metal core layer 206 may be a metal plating that extends continuously or substantially continuously across the bottom surface of the first board 200 and has sufficient thickness to maintain the temperature of the LEDs 207 at a desired temperature range of, for example, about 30° C. to about 40° C. Without the heat sink properties of the metal core layer 106, the LEDs 207 may operate at significantly higher temperatures (e.g., about 20° C. to 30° C. higher), which could lead to a change in the LED characteristics and to an undesirable change in the color and intensity of the light output of the lighting system. In some examples, the metal core layer 206 includes a thermally and electrically conductive material (e.g., one with sufficiently low heat resistance and electrical sheet resistance), such as aluminum, copper, and/or the like.

The integrated multi-layered lighting system 3 further includes an integrated light driver 230 configured to drive the LEDs 207. The integrated light driver 230 includes the rectifier 40 and driver 30/30-1 (of FIG. 1/3). The light driver 230 includes a plurality of first components 208 coupled to the first board 200 and positioned in the first component area 202, and a plurality of second components 218 coupled to the second board 210 and positioned in the second component area 212. According to some embodiments, the plurality of first components 208 include surface-mount electrical components, and the plurality of second components 218 include through-hole-mounted electrical components. In some examples, the first components 208 do not include any through-hole components to avoid utilizing plated/insulated vias to insulate through-hole pins of such components from the grounded metal core layer 206, which can increase cost of the lighting system.

The first components 208 may be positioned on (e.g., soldered to) the forward-facing side of the first board 200 that is opposite from the metal core layer 206, and are electrically coupled to one another via a plurality of traces. The second components 218 may be placed on at least one of the rear-facing side of second board 210 (which faces the forward-facing side of the first board 200) and the forward-facing side of the second board 200 (which is opposite from the rear-facing side of second board 210), and are connect to one another through traces running on the top and/or bottom of the second board 210. The second components on opposite sides of the second board 210 may also be electrically connected through one or more electrical vias within the second board 210.

In some embodiments, the integrated light driver 230 includes the multi-channel light driver 30/30-1 and the rectifier 40. For example, the integrated light driver 230 includes the transformer 54 with a primary side 54*a* and a secondary side 54*b* that is electrically isolated from, and inductively coupled to, the primary side 54*a*. The first components 208 may include components that are electrically coupled at the secondary side 54*b* of the light driver 230, and the second components 218 may include components electrically coupled at the primary side 54*a*. In some examples, the ground reference of the second board 210 is electrically isolated from the metal core layer 206 of the first board 200. The air gap between the first and second boards 200 and 210 may also serve to improve the electrical isolation between the components 208 and 218 of the two boards. However, embodiments of the present disclosure are not limited thereto, and in some examples the ground reference of second board 210 may be capacitively coupled to the metal core layer 206 of the first board 200 via one or more safety capacitors.

In some examples, the plurality of first components 208 mounted to the first board 200 may include the rectifier 60, the low pass filter 70, the current sensor 82, the error amplifier 86, the VCR (e.g., FET) 88, and the channel controller 100. The plurality of second components 218 mounted to the second board 210 may include the rectifier 40, the regulator 52, the transformer 54, the PFC circuit 56, and the optocoupler 120. In some examples, the secondary winding 54*b* of the transformer 54, which is mounted on the second board 210, may be electrically connected to the rectifiers 60 of the first board 200 via one or more electrical connectors/links 209.

As shown in FIG. 1, the integrated multi-layered lighting system 3 is not limited to having two tiers, and may include a any suitable number of layers. For example, the lighting system 3 may further include a third board 220 coupled to and offset from the second board 210. The third board 220 has a second opening 224 overlapping the first light area 204 of the first board 200 in a plan view, and having a third component area 222 overlapping the second component area 212 of the second board 210 in a plan view. In some examples, the light driver 230 further includes a plurality of third components 228 that are coupled to the third board 220 and positioned in the third component area 222. The third components 228 may include one or more surface-mount components and one or more through-hole-mounted components that may be located on either side of the third board 220.

The third board 220 may be physically offset from (e.g., vertically offset from) the second board 210 via second spacers (e.g., separators) 211. The first and second spacers 201 and 211 physically support the second and third boards 210 and 220, and prevent the boards 200, 210, and 220 from collapsing or bending.

In some examples, the first board 200 may be substantially circular and the second and third boards 210 and 220 may have a ring shape. Further, the first to third boards 200 to 220 may have the same or substantially the same diameter; however, embodiments of the present disclosure are not limited thereto, and the boards 200-220 may have any suitable shape and size to fit within an existing wall fixture.

Accordingly, as described above, the multi-tiered design of the lighting system 3 provides additional surface area to mount the various components of the light driver 230 in the vertical direction, which allows the lighting system 3 to have a more compact design with a smaller footprint, as compared to designs of the related art. This may allow the entire lighting system 3 to fit into a single wall fixture without the need for external power electronic circuitry or other external components. The lighting system 3 includes a multi-channel LED driver that is a dimmable and also performs color mixing of the emitted light to replicate light color temperatures (temperature in Kelvins, K) which follow the black body curve.

It will be understood that, although the terms “first”, “second”, “third”, etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms “a” and “an” are intended to include the plural forms as well, unless the context clearly indicates otherwise. It will be further understood that the terms “include”, “including”, “comprises”, and/or “comprising”, when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "substantially", "about", and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

The integrated multi-layered lighting system and/or any other relevant devices or components according to embodiments of the present invention described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the LED driver may be implemented on a flexible printed circuit film, a tape carrier package (TCP), a printed circuit board (PCB), or formed on the same substrate. Further, the various components of the LED driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. An integrated multi-layered lighting system comprising:

a first board;

a second board coupled to and offset from the first board, the second board having a first opening overlapping the first board in a plan view;

a plurality of light emitting diodes (LEDs) positioned on the first board; and a light driver configured to drive the plurality of LEDs and comprising a plurality of first components coupled to the first board and a plurality of second components coupled to the second board.

2. The integrated multi-layered lighting system of claim 1, wherein the first board comprises a metal core layer configured to be mounted to a fixture, the metal core layer being opposite from the plurality of LEDs.

3. The integrated multi-layered lighting system of claim 2, wherein the metal core layer comprises at least one of aluminum and copper.

4. The integrated multi-layered lighting system of claim 2, wherein a ground reference of the second board is electrically isolated from the metal core layer of the first board.

5. The integrated multi-layered lighting system of claim 2, wherein the metal core layer of the first board is configured to dissipate heat generated by the LEDs to the fixture and to provide electrical ground to the LEDs.

6. The integrated multi-layered lighting system of claim 1, wherein the plurality of first components comprise surface-mount electrical components, and wherein the plurality of second components comprise through-hole-mounted electrical components.

7. The integrated multi-layered lighting system of claim 1, wherein the light driver has a primary side and a secondary side electrically isolated from, and inductively coupled to, the primary side, wherein the plurality of first components comprises components electrically coupled at the secondary side, and wherein the plurality of second components comprises components electrically coupled at the primary side.

8. The integrated multi-layered lighting system of claim 7, wherein the plurality of first components comprises:

a current sensor configured to sense a first channel current of the plurality of LEDs and to generate a first sense signal;

an error amplifier configured to receive the first sense signal and a first reference signal, and to generate a gate control signal based on a difference between the first reference signal and the first sense signal;

a voltage-controlled resistor (VCR) configured to adjust the first channel current by dynamically adjusting a resistance of the VCR based on the gate control signal; and a channel controller configured generate the first reference signal based on a color temperature according to a black body curve.

9. The integrated multi-layered lighting system of claim 8, wherein the VCR comprises:

a field effect transistor (FET) having a gate electrically coupled to an output of the error amplifier.

10. The integrated multi-layered lighting system of claim 7, wherein the plurality of first components further comprises:

a first rectifier coupled to a secondary winding of a transformer of the light driver and configured to prevent a reverse current at a first color channel of the plurality of LEDs; and a first low pass filter coupled between the first rectifier and the first color channel and configured to produce a first channel current as a first DC current.

11. The integrated multi-layered lighting system of claim 7, wherein the plurality of second components comprises:

a rectifier configured to rectify an input AC signal and to generate a rectified input signal;

a regulator configured to generate an output signal based on the rectified input signal for driving the LEDs;

a power factor correction (PFC) circuit configured to regulate a DC-level of the output signal based on a correction signal;

a transformer having the primary side and the secondary side; and an optocoupler configured to communicate the correction signal to the PFC circuit from the secondary side of the light driver.

12. The integrated multi-layered lighting system of claim 1, further comprising:

a third board coupled to and offset from the second board, the third board having a second opening overlapping a first light area of the first board in a plan view, and a third component area overlapping a second component area of the second board in a plan view, wherein the light driver further comprises a plurality of third components coupled to the third board and positioned in the third component area.

13. The integrated multi-layered lighting system of claim 12, wherein the plurality of third components comprise at least one of a surface-mount component and a through-hole-mounted component.

14. The integrated multi-layered lighting system of claim 1, wherein the plurality of LEDs comprise one or more green LEDs, one or more blue LEDs, and one or more red LEDs.

15. The integrated multi-layered lighting system of claim 1, wherein the second board is physically offset from the first board via one or more spacers.

16. The integrated multi-layered lighting system of claim 1, wherein a second component area entirely surrounds the first opening in a plan view.

17. The integrated multi-layered lighting system of claim 1, wherein the plurality of first components in a first component area are in a gap between the first and second boards.

18. The integrated multi-layered lighting system of claim 1, wherein the first board has a first component area and a first light area, wherein the second board has a second component area overlapping the first component area of the first board in a plan view, wherein the plurality of first components is positioned in the first component area, the plurality of LEDs is positioned in the first light area, and the plurality of second components is positioned in the second component area.

19. The integrated multi-layered lighting system of claim 1, wherein the plurality of first components are positioned in a gap between the first and second boards.

* * * * *